US011539621B2

(12) United States Patent
Melgangolli et al.

(10) Patent No.: US 11,539,621 B2
(45) Date of Patent: Dec. 27, 2022

(54) CONTROLLER AREA NETWORK MESSAGES IN AN AUTONOMOUS VEHICLE

(71) Applicant: Motional AD LLC, Boston, MA (US)

(72) Inventors: Vasudeva Pai Melgangolli, Pittsburgh, PA (US); William Tan, Singapore (SG); Lixun Lin, Singapore (SG)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/167,059

(22) Filed: Feb. 3, 2021

(65) Prior Publication Data

US 2022/0247681 A1 Aug. 4, 2022

(51) Int. Cl.
| | |
|---|---|
| *H04L 45/74* | (2022.01) |
| *H04L 12/40* | (2006.01) |
| *H04L 12/66* | (2006.01) |
| *H04L 12/46* | (2006.01) |
| *H04L 67/12* | (2022.01) |
| *H04L 69/08* | (2022.01) |
| *H04L 69/164* | (2022.01) |
| *H04L 69/16* | (2022.01) |
| *H04L 69/00* | (2022.01) |

(52) U.S. Cl.
CPC ............. *H04L 45/74* (2013.01); *H04L 12/40* (2013.01); *H04L 12/66* (2013.01); *H04L 2012/40215* (2013.01)

(58) Field of Classification Search
CPC . H04L 2012/40208; H04L 2012/40215; H04L 12/40; H04L 12/66; H04L 45/74
See application file for complete search history.

(56) References Cited

U.S. PATENT DOCUMENTS

| | | | | |
|---|---|---|---|---|
| 5,448,561 A | * | 9/1995 | Kaiser | H04L 29/06 370/471 |
| 2003/0135622 A1 | * | 7/2003 | Anderson | H04L 69/22 709/227 |
| 2014/0133350 A1 | | 5/2014 | Triess et al. | |
| 2015/0229741 A1 | * | 8/2015 | Kim | H04L 67/12 370/467 |
| 2018/0062988 A1 | | 3/2018 | Sikaria et al. | |
| 2019/0079842 A1 | | 3/2019 | Chae et al. | |
| 2019/0132424 A1 | * | 5/2019 | Jeong | H04L 12/40006 |
| 2019/0253272 A1 | | 8/2019 | Kolbus et al. | |
| 2019/0306180 A1 | * | 10/2019 | Dyakin | H04L 63/1416 |
| 2020/0029209 A1 | * | 1/2020 | Nölscher | H04W 12/069 |
| 2021/0058267 A1 | * | 2/2021 | Prest | H04L 9/3226 |
| 2021/0294889 A1 | * | 9/2021 | Zeh | H04L 9/14 |
| 2021/0297284 A1 | * | 9/2021 | Maeda | H04L 12/40032 |

FOREIGN PATENT DOCUMENTS

KR 2019-0029994 3/2019

* cited by examiner

*Primary Examiner* — Jenee Holland
(74) *Attorney, Agent, or Firm* — Fish & Richardson P.C.

(57) ABSTRACT

Embodiments herein relate to a controller area network (CAN) Ethernet gateway (CEG) is communicatively coupled with a first CAN bus and a second CAN bus, and configured to generate a user datagram protocol (UDP) packet. The UDP packet includes a packet header, a first data portion that includes a CAN header and CAN data related to the first CAN bus, and a second data portion that includes a CAN header and CAN data related to the second CAN bus. Other embodiments are described and/or claimed.

20 Claims, 10 Drawing Sheets

Identifying a first data related to a first CAN bus and a second data related to a second CAN bus
905

Generating a UDP packet that includes a first data portion related to the first data and a second data portion related to the second data
910

Transmitting the UDP packet to a computing device via an Ethernet link
915

FIG. 9

```
                    ┌─────────────────────────────────────────────┐
                    │ Determining, in a UDP packet received via an Ethernet │
                    │ connection from a computing device, a first data portion related │
                    │ to a first CAN bus and a second data portion related to a second │
                    │                    CAN bus                   │
                    │                     1005                     │
                    └─────────────────────┬───────────────────────┘
                                          │
                                          ▼
                    ┌─────────────────────────────────────────────┐
                    │ Facilitating transmission of the first CAN data by the first CAN │
                    │                      bus                     │
                    │                     1010                     │
                    └─────────────────────┬───────────────────────┘
                                          │
                                          ▼
                    ┌─────────────────────────────────────────────┐
                    │ Facilitating transmission of the second CAN data by the second │
                    │                    CAN bus                   │
                    │                     1015                     │
                    └─────────────────────────────────────────────┘
```

FIG. 10

CONTROLLER AREA NETWORK MESSAGES IN AN AUTONOMOUS VEHICLE

FIELD OF THE INVENTION

This description relates to controller area network (CAN) messages in an autonomous vehicle.

BACKGROUND

Various components of a vehicle, for example sensors of an autonomous vehicle (AV), use CAN messages to communicate with one another or with a processor of the vehicle.

BRIEF DESCRIPTION OF THE DRAWINGS

FIG. 9 shows an example technique related to the UDP packet of FIG. 6, in accordance with various embodiments.

FIG. 10 shows an alternative example technique related to the UDP packet of FIG. 6, in accordance with various embodiments.

DETAILED DESCRIPTION

Figure 1:
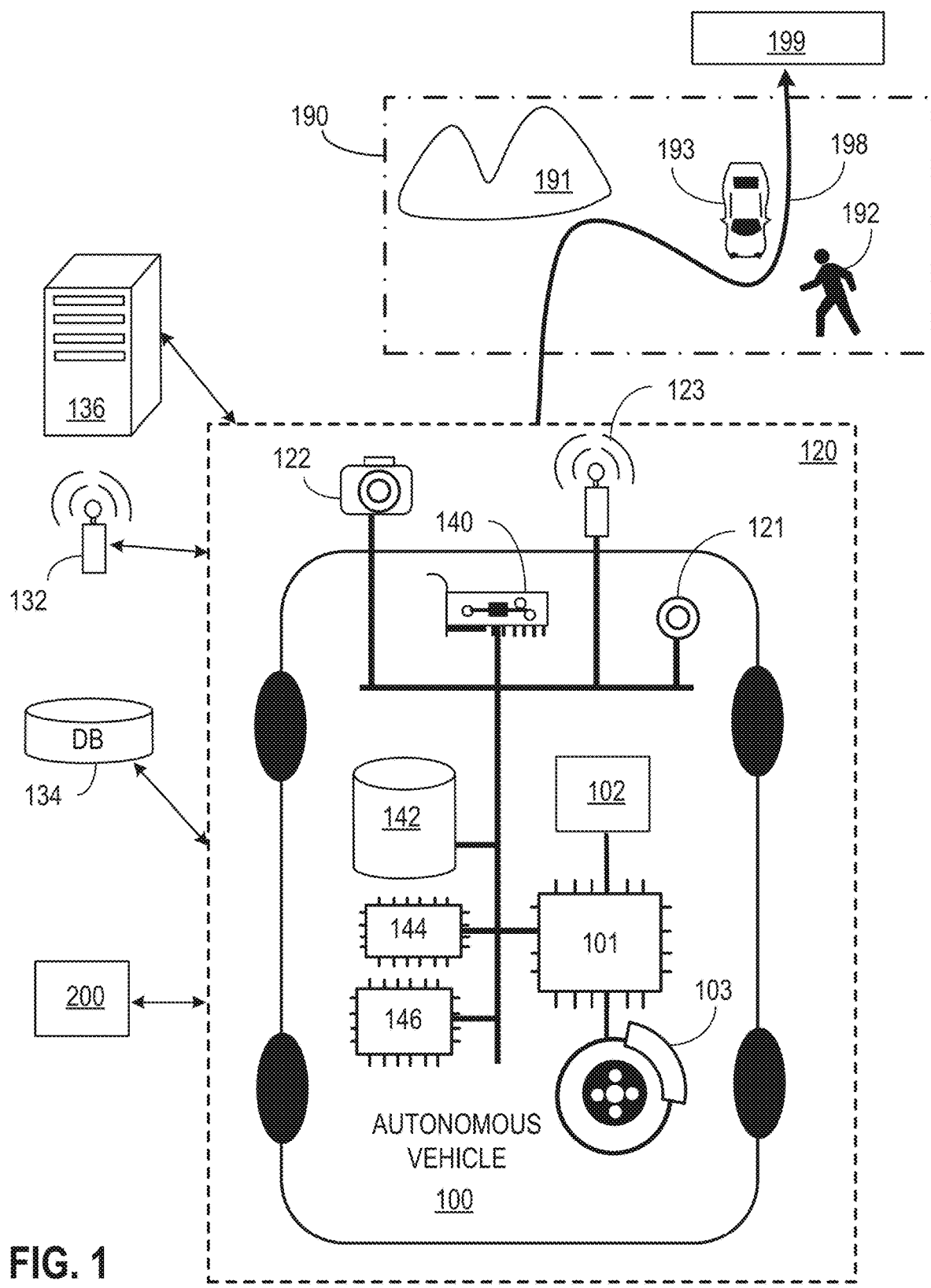
FIG. 1 shows an example of an AV having autonomous capability.

In the following description, for the purposes of explanation, numerous specific details are set forth in order to provide a thorough understanding of the present disclosure. It will be apparent, however, that the present disclosure can be practiced without these specific details. In other instances, well-known structures and devices are shown in block diagram form in order to avoid unnecessarily obscuring the present disclosure.

In the drawings, specific arrangements or orderings of schematic elements, such as those representing devices, modules, systems, instruction blocks, and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. AV Architecture
4. AV Control
5. CAN Bus and CEG Techniques General Overview A controller area network (CAN) Ethernet gateway (CEG) is configured to serve as a proxy to convert CAN messages to user datagram protocol (UDP) packets for transmission between different elements of an AV. In an embodiment, the CEG is communicatively coupled with a plurality of CAN busses, and the UDP packet includes data related to a plurality of CAN busses.

Some of the advantages of these techniques include the ability to overcome limited CAN bus resources by packaging data related to multiple CAN busses into a single UDP packet. In this manner, the data from multiple CAN busses sent over a single Ethernet connection, which has significantly higher bandwidth than the CAN busses. This use of Ethernet rather than multiple CAN busses will avoid a complicated hardware setup of the CAN busses, thereby reducing resources in terms of both design cost and physical space.

System Overview

FIG. 1 shows an example of a vehicle 100 having autonomous capability.

As used herein, the term "autonomous capability" refers to a function, feature, or facility that enables a vehicle to be partially or fully operated without real-time human intervention, including without limitation fully AVs, highly AVs, and conditionally AVs.

As used herein, an AV is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a random-access memory (RAM) and/or a non-volatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "OTA update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment.

In general, this document describes technologies applicable to any vehicles that have one or more autonomous capabilities including fully AVs, highly AVs, and conditionally AVs, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially AVs and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems can automate certain vehicle operations (e.g., steering, braking, and using maps) under certain operating conditions based on processing of sensor inputs. The technologies described in this document can benefit vehicles in any levels, ranging from fully AVs to human-operated vehicles.

AVs have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the vehicle 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, including instructions for a vehicle to start moving forward, stop moving forward, start moving backward, stop moving backward, accelerate, decelerate, perform a left turn, and perform a right turn. In an embodiment, computing processors 146 are similar to the processor 204 described below in reference to FIG. 2. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the vehicle 100, such as the AV's position, linear and angular velocity and acceleration, and heading (e.g., an orientation of the leading end of vehicle 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 208 or storage device 210 described below in relation to FIG. 2. In an embodiment, memory 144 is similar to the main memory 206 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the vehicle 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the vehicle 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among AVs.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment. The communication devices 140 transmit data collected from sensors 121 or other data related to the operation of vehicle 100 to the remotely located database 134. In an embodiment, communication devices 140 transmit information that relates to teleoperations to the vehicle 100. In some embodiments, the vehicle 100 communicates with other remote (e.g., "cloud") servers 136.

In an embodiment, the remotely located database 134 also stores and transmits digital data (e.g., storing data such as road and street locations). Such data is stored on the memory 144 on the vehicle 100, or transmitted to the vehicle 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data can be stored on the memory 144 on the vehicle 100, or transmitted to the vehicle 100 via a communications channel from the remotely located database 134.

Computer processors 146 located on the vehicle 100 algorithmically generate control actions based on both real-time sensor data and prior information, allowing the AV system 120 to execute its autonomous driving capabilities.

In an embodiment, the AV system 120 includes computer peripherals 132 coupled to computer processors 146 for providing information and alerts to, and receiving input from, a user (e.g., an occupant or a remote user) of the vehicle 100. In an embodiment, peripherals 132 are similar to the display 212, input device 214, and cursor controller 216 discussed below in reference to FIG. 2. The coupling is wireless or wired. Any two or more of the interface devices can be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third-party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third-party AV systems, etc.

In an embodiment, the AV system 120 or the cloud server 136 determines if certain information associated with a passenger can be accessed by the vehicle 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the vehicle 100, or to another AV. This enables the passenger's privacy level to specify which other entities are allowed to receive data about the passenger's actions or other data associated with the passenger.

Figure 2:
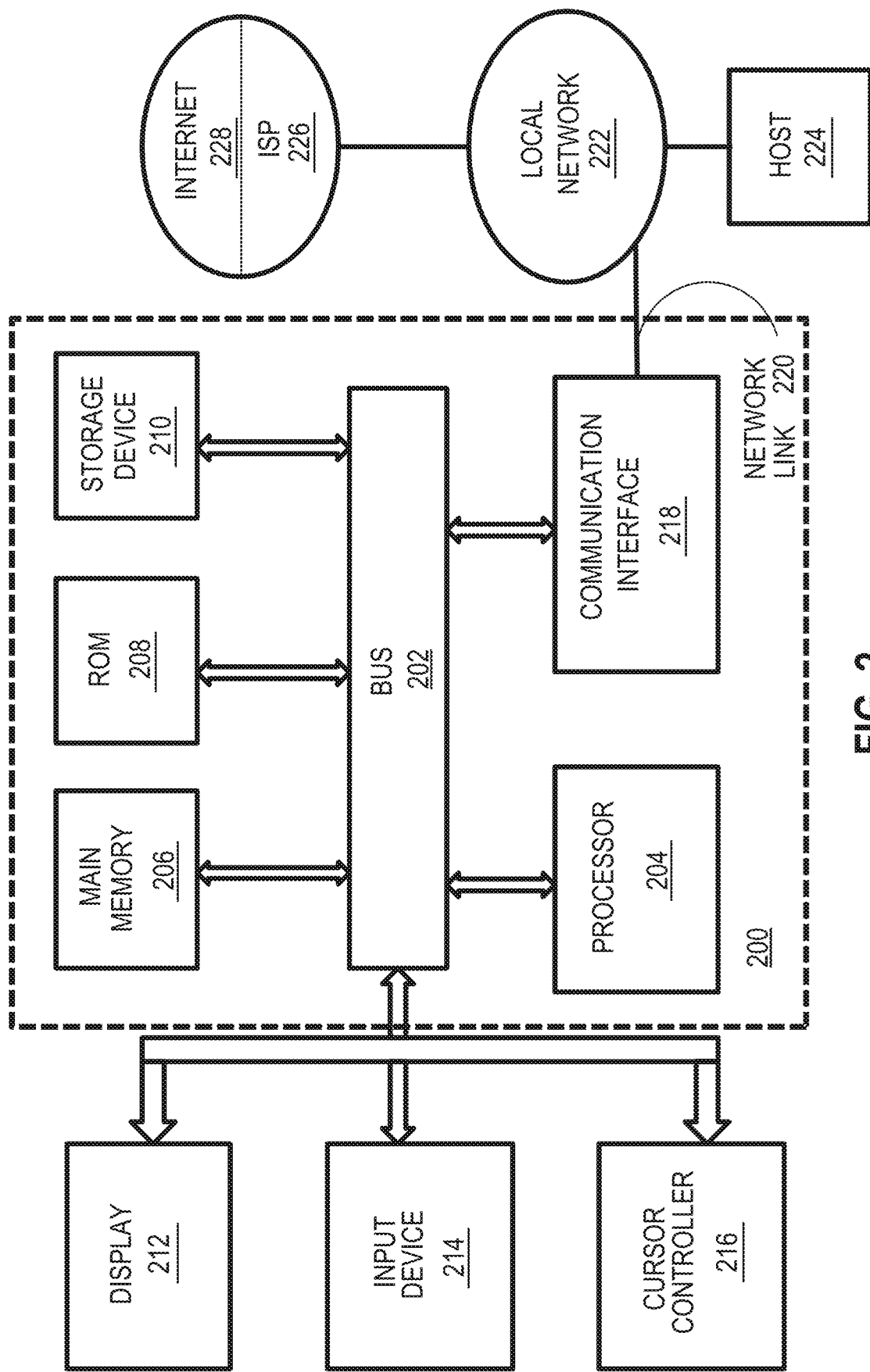
FIG. 2 shows a computer system.

FIG. 2 shows a computer system 200. In an implementation, the computer system 200 is a special-purpose computing device. The special-purpose computing device is hard-wired to perform the techniques or includes digital electronic devices such as one or more ASICs or field programmable gate arrays (FPGAs) that are persistently programmed to perform the techniques, or can include one or more general-purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 200 includes a bus 202 or other communication mechanism for communicating information, and a processor 204 coupled with a bus 202 for processing information. The processor 204 is, for example, a general-purpose microprocessor. The computer system 200 also includes a main memory 206, such as a RAM or other dynamic storage device, coupled to the bus 202 for storing information and instructions to be executed by processor 204. In one implementation, the main memory 206 is used for storing temporary variables or other intermediate information during execution of instructions to be executed by the processor 204. Such instructions, when stored in non-transitory storage media accessible to the processor 204, render the computer system 200 into a special-purpose machine that is customized to perform the operations specified in the instructions.

In an embodiment, the computer system 200 further includes a read only memory (ROM) 208 or other static storage device coupled to the bus 202 for storing static information and instructions for the processor 204. A storage device 210, such as a magnetic disk, optical disk, solid-state drive, or three-dimensional cross point memory is provided and coupled to the bus 202 for storing information and instructions.

In an embodiment, the computer system 200 is coupled via the bus 202 to a display 212, such as a cathode ray tube (CRT), a liquid crystal display (LCD), plasma display, light emitting diode (LED) display, or an organic light emitting diode (OLED) display for displaying information to a computer user. An input device 214, including alphanumeric and other keys, is coupled to bus 202 for communicating information and command selections to the processor 204. Another type of user input device is a cursor controller 216, such as a mouse, a trackball, a touch-enabled display, or cursor direction keys for communicating direction information and command selections to the processor 204 and for controlling cursor movement on the display 212. This input device typically has two degrees of freedom in two axes, a first axis (e.g., x-axis) and a second axis (e.g., y-axis), that allows the device to specify positions in a plane.

According to one embodiment, the techniques herein are performed by the computer system 200 in response to the processor 204 executing one or more sequences of one or more instructions contained in the main memory 206. Such instructions are read into the main memory 206 from another storage medium, such as the storage device 210. Execution of the sequences of instructions contained in the main memory 206 causes the processor 204 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 210. Volatile media includes dynamic memory, such as the main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 202. Transmission media can also take the form of acoustic or light waves, such as those generated during radio-wave and infrared data communications.

In an embodiment, various forms of media are involved in carrying one or more sequences of one or more instructions to the processor 204 for execution. For example, the instructions are initially carried on a magnetic disk or solid-state drive of a remote computer. The remote computer loads the instructions into its dynamic memory and send the instructions over a telephone line using a modem. A modem local to the computer system 200 receives the data on the telephone line and use an infrared transmitter to convert the data to an infrared signal. An infrared detector receives the data carried in the infrared signal and appropriate circuitry places the data on the bus 202. The bus 202 carries the data to the main memory 206, from which processor 204 retrieves and executes the instructions. The instructions received by the main memory 206 can optionally be stored on the storage device 210 either before or after execution by processor 204.

The computer system 200 also includes a communication interface 218 coupled to the bus 202. The communication interface 218 provides a two-way data communication coupling to a network link 220 that is connected to a local network 222. For example, the communication interface 218 is an integrated service digital network (ISDN) card, cable modem, satellite modem, or a modem to provide a data communication connection to a corresponding type of telephone line. As another example, the communication interface 218 is a local area network (LAN) card to provide a data communication connection to a compatible LAN. In some implementations, wireless links are also implemented. In any such implementation, the communication interface 218 sends and receives electrical, electromagnetic, or optical signals that carry digital data streams representing various types of information.

The network link 220 typically provides data communication through one or more networks to other data devices. For example, the network link 220 provides a connection through the local network 222 to a host computer 224 or to a cloud data center or equipment operated by an Internet Service Provider (ISP) 226. The ISP 226 in turn provides data communication services through the world-wide packet data communication network now commonly referred to as the "Internet" 228. The local network 222 and Internet 228 both use electrical, electromagnetic or optical signals that carry digital data streams. The signals through the various networks and the signals on the network link 220 and through the communication interface 218, which carry the digital data to and from the computer system 200, are example forms of transmission media. In an embodiment, the network 220 contains the cloud or a part of the cloud.

In some embodiments, the communication interface 218 is an Ethernet switch that is configured to enable communication between elements of the computer system 200 and another device over Ethernet protocols. Specifically, the network link 220 in this embodiment is an Ethernet link. The local network 222 includes elements such as a CEG and at least one CAN bus (which will be described in further detail below with respect to FIG. 5).

The computer system 200 sends messages and receives data, including program code, through the network(s), the network link 220, and the communication interface 218. In an embodiment, the computer system 200 receives code for processing. The received code is executed by the processor 204 as it is received, and/or stored in storage device 210, or other non-volatile storage for later execution.

AV Architecture

Figure 3:
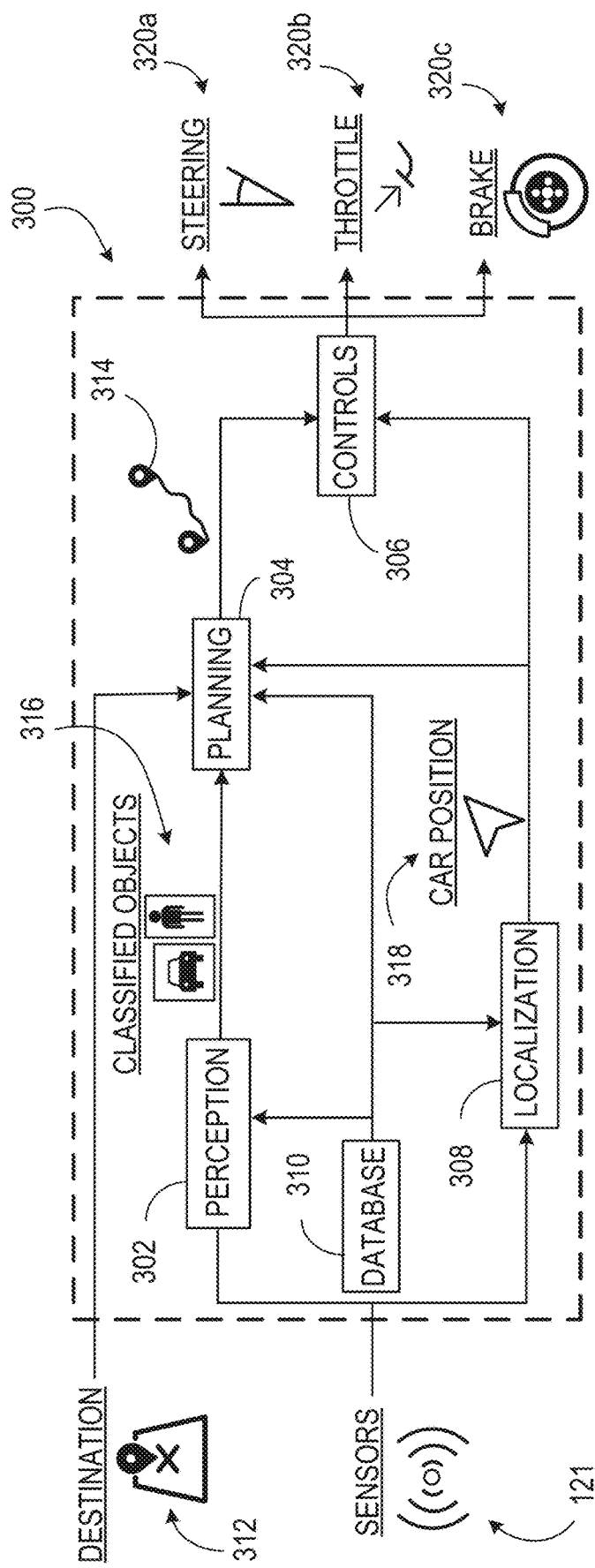
FIG. 3 shows an example architecture for an AV.

FIG. 3 shows an example architecture 300 for an AV (e.g., the vehicle 100 shown in FIG. 1). The architecture 300 includes a perception system 302 (sometimes referred to as a perception circuit), a planning system 304 (sometimes referred to as a planning circuit), a control system 306 (sometimes referred to as a control circuit), a localization system 308 (sometimes referred to as a localization circuit), and a database system 310 (sometimes referred to as a database circuit). Each system plays a role in the operation of the vehicle 100. Together, the systems 302, 304, 306, 308, and 310 can be part of the AV system 120 shown in FIG. 1. In some embodiments, any of the systems 302, 304, 306, 308, and 310 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the systems 302, 304, 306, 308, and 310 is sometimes referred to as a processing circuit (e.g., computer hardware, computer software, or a combination of the two). A combination of any or all of the systems 302, 304, 306, 308, and 310 is also an example of a processing circuit.

In use, the planning system 304 receives data representing a destination 312 and determines data representing a trajectory 314 (sometimes referred to as a route) that can be traveled by the vehicle 100 to reach (e.g., arrive at) the destination 312. In order for the planning system 304 to determine the data representing the trajectory 314, the planning system 304 receives data from the perception system 302, the localization system 308, and the database system 310.

The perception system 302 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 316 is provided to the planning system 304.

The planning system 304 also receives data representing the AV position 318 from the localization system 308. The localization system 308 determines the AV position by using data from the sensors 121 and data from the database system 310 (e.g., a geographic data) to calculate a position. For example, the localization system 308 uses data from a GNSS (Global Navigation Satellite System) sensor and geographic data to calculate a longitude and latitude of the AV. In an embodiment, data used by the localization system 308 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control system 306 receives the data representing the trajectory 314 and the data representing the AV position 318 and operates the control functions 320*a-c* (e.g., steering, throttling, braking, ignition) of the AV in a manner that will cause the vehicle 100 to travel the trajectory 314 to the destination 312. For example, if the trajectory 314 includes a left turn, the control system 306 will operate the control functions 320*a-c* in a manner such that the steering angle of the steering function will cause the vehicle 100 to turn left and the throttling and braking will cause the vehicle 100 to pause and wait for passing pedestrians or vehicles before the turn is made.

AV Control

Figure 4:
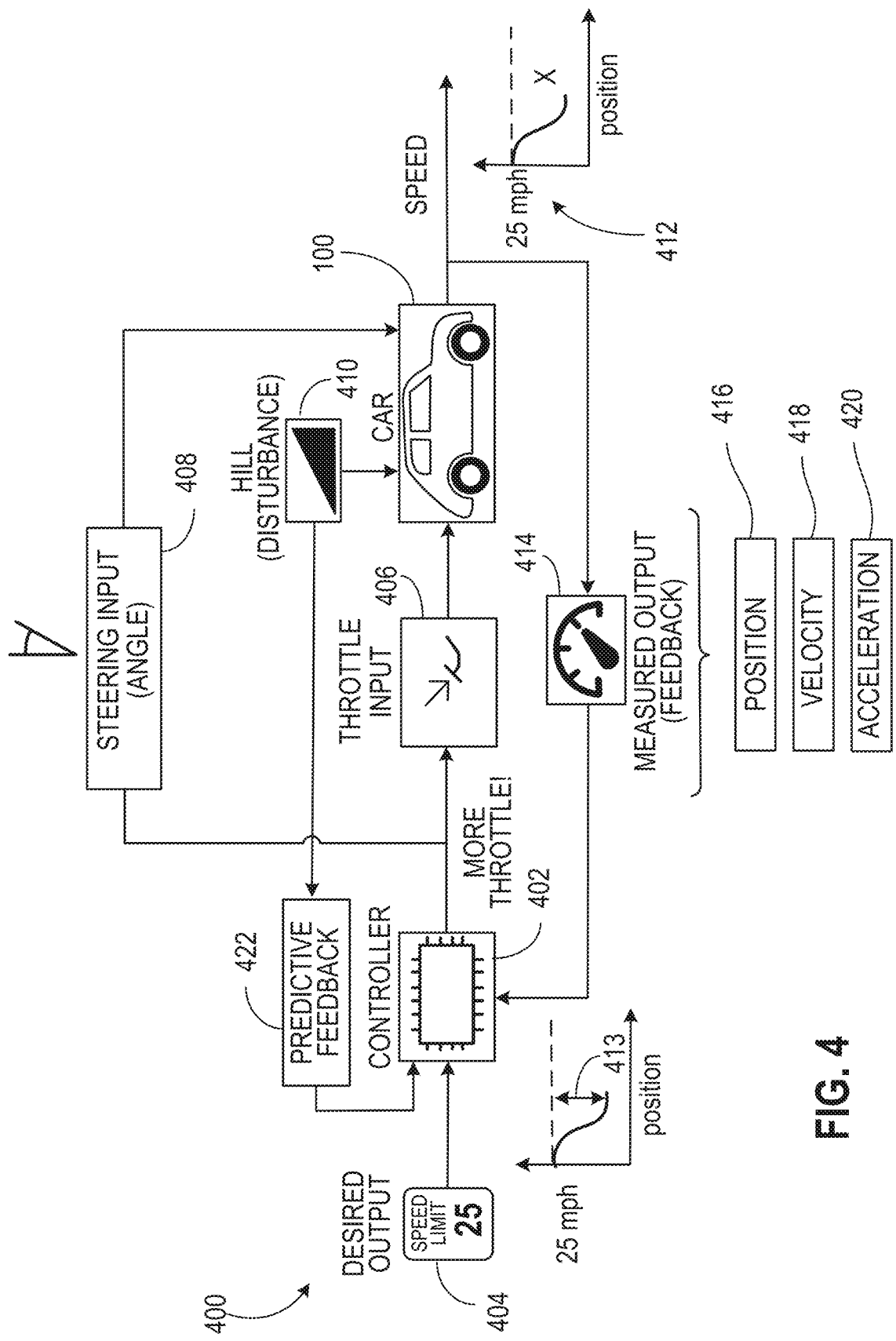
FIG. 4 shows a block diagram of the inputs and outputs of a control system.

FIG. 4 shows a block diagram 400 of the inputs and outputs of a control system 306 (e.g., as shown in FIG. 3). A control system operates in accordance with a controller 402 which includes, for example, one or more processors (e.g., one or more computer processors such as microprocessors or microcontrollers or both) similar to processor 204, short-term and/or long-term data storage (e.g., memory, RAM, flash memory, etc.) similar to main memory 206, ROM 208, and storage device 210, and instructions stored in memory that carry out operations of the controller 402 when the instructions are executed (e.g., by the one or more processors).

In an embodiment, the controller 402 receives data representing a desired output 404. The desired output 404 typically includes a velocity, e.g., a speed and a heading. The desired output 404 can be based on, for example, data received from a planning system 304 (e.g., as shown in FIG. 3). In accordance with the desired output 404, the controller 402 produces data usable as a throttle input 406 and a steering input 408. The throttle input 406 represents the magnitude in which to engage the throttle (e.g., acceleration control) of a vehicle 100, e.g., by engaging the steering pedal, or engaging another throttle control, to achieve the desired output 404. In some examples, the throttle input 406 also includes data usable to engage the brake (e.g., deceleration control) of the vehicle 100. The steering input 408 represents a steering angle, e.g., the angle at which the steering control (e.g., steering wheel, steering angle actuator, or other functionality for controlling steering angle) of the AV should be positioned to achieve the desired output 404.

In an embodiment, the controller 402 receives feedback that is used in adjusting the inputs provided to the throttle and steering. For example, if the vehicle 100 encounters a disturbance 410, such as a hill, the measured speed 412 of the vehicle 100 is lowered below the desired output speed. In an embodiment, any measured output 414 is provided to the controller 402 so that the necessary adjustments are performed, e.g., based on the differential 413 between the measured speed and desired output. The measured output 414 includes a measured position 416, a measured velocity 418 (including speed and heading), a measured acceleration 420, and other outputs measurable by sensors of the vehicle 100.

In an embodiment, information about the disturbance 410 is detected in advance, e.g., by a sensor such as a camera or LiDAR sensor, and provided to a predictive feedback system 422. The predictive feedback system 422 then provides information to the controller 402 that the controller 402 can use to adjust accordingly. For example, if the sensors of the vehicle 100 detect ("see") a hill, this information can be used by the controller 402 to prepare to engage the throttle at the appropriate time to avoid significant deceleration.

CAN Bus and CEG Techniques

As previously noted, embodiments herein relate to a CEG that is configured to serve as a proxy to convert CAN messages to UDP packets for transmission between different elements of an AV. In an embodiment, the CEG is communicatively coupled with a plurality of CAN busses, and the UDP packet includes data related to a plurality of CAN busses.

Figure 5:
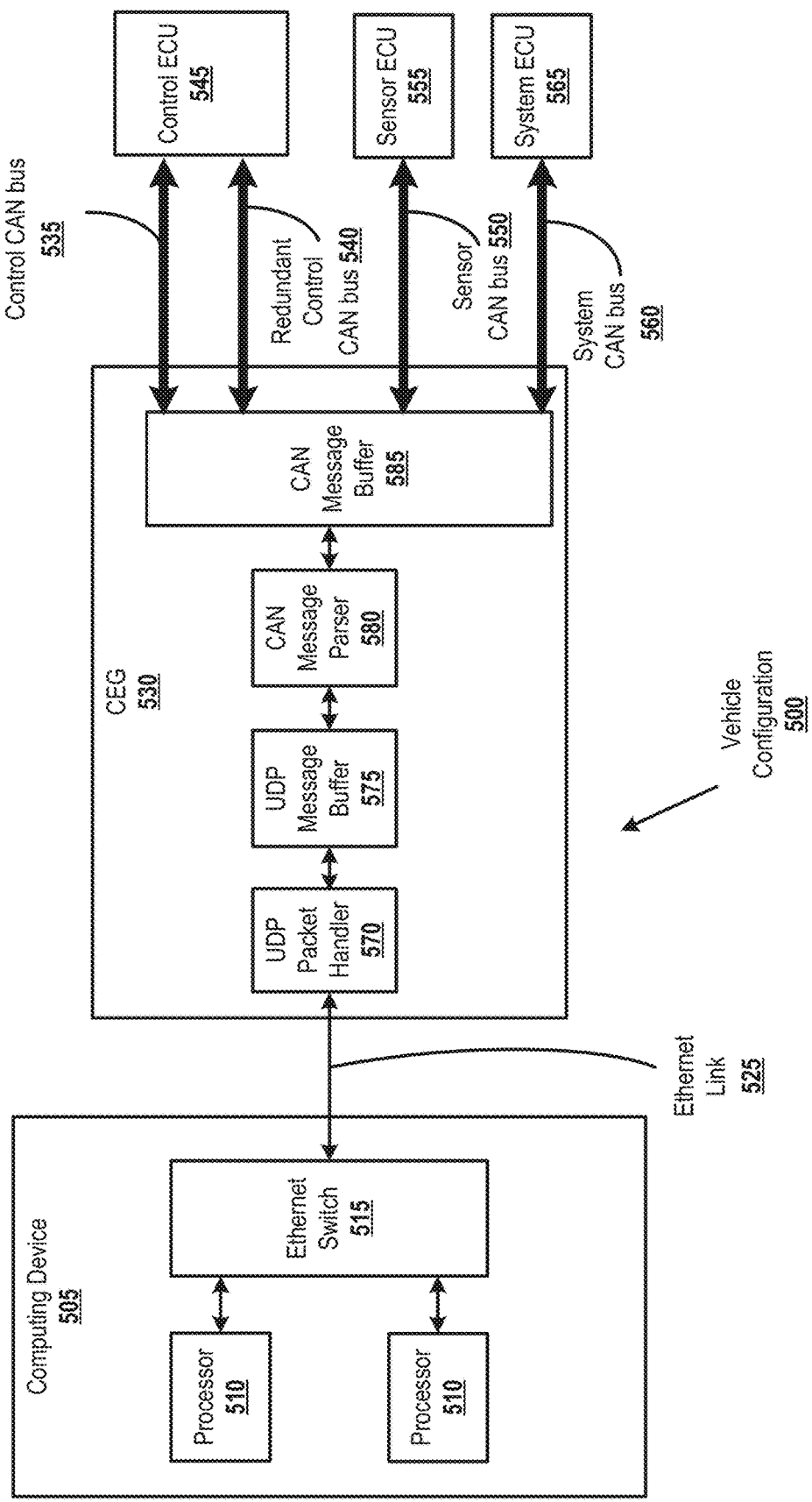
FIG. 5 shows an example vehicle configuration with a CAN Ethernet gateway (CEG), in accordance with various embodiments.

FIG. 5 shows an example vehicle configuration 500 with a CEG 530, in accordance with various embodiments. The vehicle configuration includes a computing device 505 with at least one processor 510. In this embodiment, the computing device 505 is similar to, and shares one or more characteristics with, computer system 200 (FIG. 2). Similarly, processors 510 are similar to, and share one or more characteristics with, processor 204. For example, in various embodiments the processors 510 are one or more of a central processing unit (CPU), a general processing unit (GPU), a core of a multi-core processors, etc.

The processors 510 are communicatively coupled with an Ethernet switch 515. Specifically, the Ethernet switch 515 is an element of the computing device 505 that is configured to receive data from a processor 510, convert the data to a form suitable for communication to a device over an Ethernet link 525, and transmit the data over the Ethernet link 525. Additionally or alternatively, the Ethernet switch 515 is configured to receive data over the Ethernet link 525 and provide the data to a processor 510.

The computing device 505 is communicatively coupled with CEG 530 by the Ethernet link 525. The CEG 530 is also communicatively coupled with CAN busses such as CAN busses 535, 540, 550, and 560, as will be described in greater detail below. The CEG 530 and the computing device 505 are operable to transfer data in a UDP packet from one to the other over the Ethernet link 525. In the embodiment shown in FIG. 5, the UDP packet includes CAN data that is to be transferred by the CEG 530 over a CAN bus 535/540/550/560. Alternatively, the UDP packet includes CAN data that is received by the CEG 530 over a CAN bus 535/540/550/

560, and is used to generate the UDP packet which is then transmitted to computing device 505.

Figure 6:
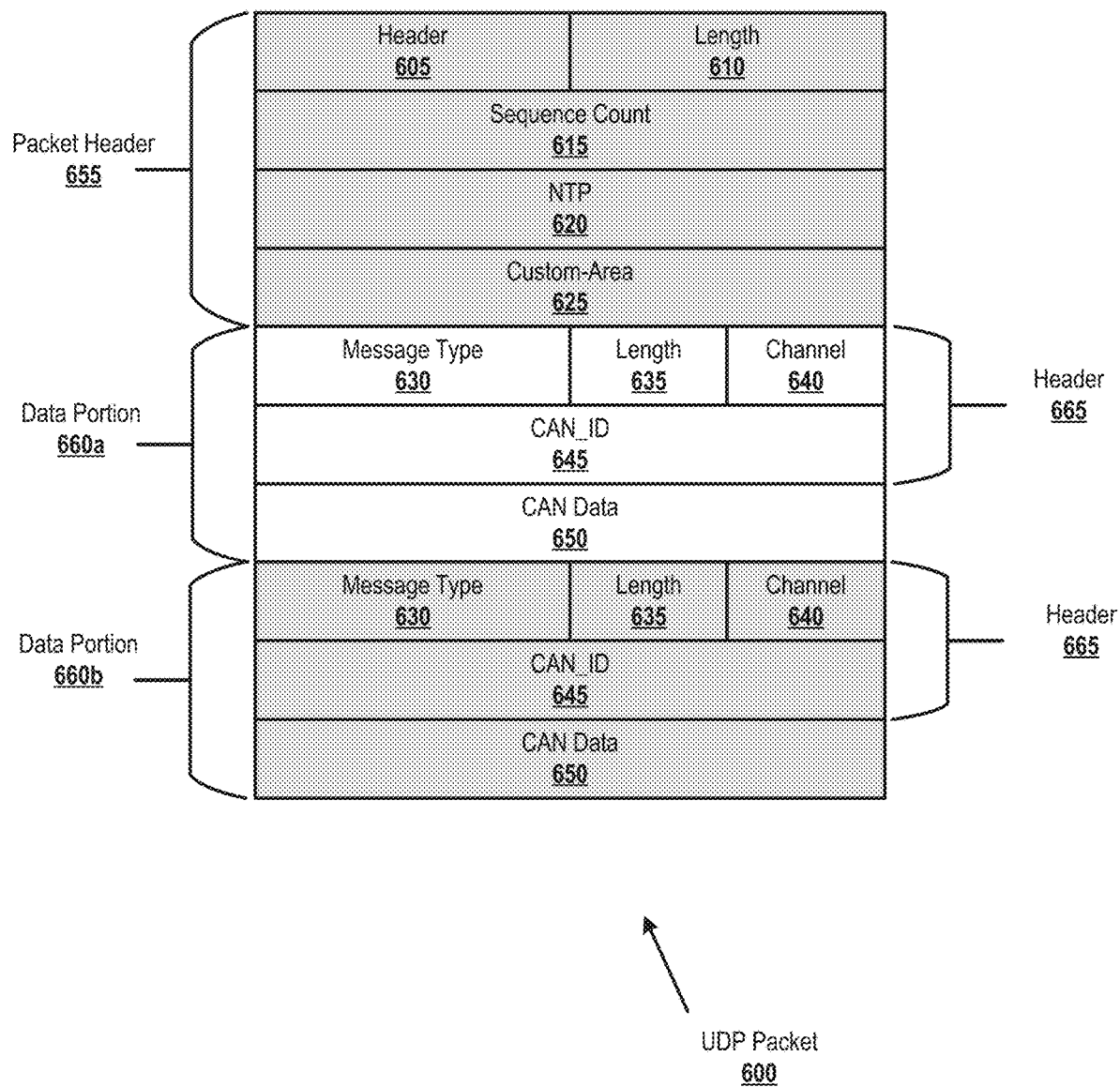
FIG. 6 shows an example user datagram protocol (UDP) packet with multiple CAN portions, in accordance with various embodiments.

FIG. 6 shows an UDP example packet with multiple data portions 660a/660b(collectively "data portions 660"), in accordance with various embodiments. In the embodiment of FIG. 6, respective ones of the data portions 660a and 660b include data related to a different CAN bus.

The UDP packet 600 includes a packet header 655 and data portions 660. The packet header 655 includes elements that describe or define parameters of the UDP packet 600. It will be understood that the specific arrangement or described lengths of the various elements of the UDP packet 600 are intended herein as high-level examples for the sake of description of an embodiment of the present disclosure. In other embodiments, the UDP packet 600 includes more or fewer elements, elements in a different arrangement, or elements with different names or lengths than are depicted in FIG. 6.

The packet header 655 includes:
  Header field 605, which in one embodiment is a 2-byte field that includes information that identifies the UDP packet 600 as a UDP packet.
  Length field 610, which in one embodiment is a 2-byte field, which identifies a length of the UPD packet 600. For example, the length field 610 identifies a total length of the UDP packet 600 in terms of bits, bytes, or some other unit of measurement. In another embodiment, the length field 610 only identifies a total length of the data portions of the UDP packet 600 (e.g., data portions 660).
  Sequence count field 615, which in one embodiment is a 4-byte field that identifies a location of the UDP packet 600 in a sequence that includes a plurality of UDP packets 600.
  Network Time Protocol (NTP) field 620, which in one embodiment is an 8-byte field that indicates a time (based on NTP) at which the UDP packet 600 was generated such that a receiver is able to identify whether the UDP packet 600 includes information that is time-relevant. In another embodiment, the UDP packet 600 does not include the NTP field 620 if, for example, elements of the CAN data in the data portions 660 are not time-sensitive.
  A custom-area 625, which is an 8-byte field related to implementation-specific data. For example, the custom-area 625 in one embodiment includes configuration data related to the specific computing device 505, processor 510, Ethernet switch 515, CEG 530, etc. In another embodiment, the custom-area 625 includes different data. In another embodiment, the custom-area 625 is not present, or is shorter than what is depicted in FIG. 6.

The UDP packet 600 further includes the data portions 660a and 660b as depicted in FIG. 6. It will be understood that although only two data portions 660a/660b are depicted in FIG. 6, in another embodiment the UDP packet 600 has more or fewer data portions. For example, in one embodiment the UDP packet 600 has as many as 90 data portions. At least two of the data portions include information related to different CAN busses of the vehicle 100, as depicted in FIG. 5 and explained in greater detail below.

With respect to the embodiment of FIG. 6, the data portion 660a includes data related to a first CAN bus, and data portion 660b includes data related to a second CAN bus. Respective ones of the data portions include a CAN header 665 and CAN data 650.

The CAN header 665 of the data portions 660a/660b includes:
  Message Type field 630, which is a 2-byte field that indicates a type of CAN-related message that is included in the data portion 660a/660b in which the CAN header 665 is located. For example, in an embodiment, the message type field 630 indicates that the CAN data field 650 of the data portion 660a or 660b includes data related to a specific CAN bus, or a component that is communicatively coupled with the specific CAN bus. However, in another embodiment the message type field 630 indicates that the CAN data field 650 includes configuration or initialization information related to that CAN bus or component.
  Length field 635, which is a 1-byte field that indicates a length of the data portion 660 in which it is located, or, in another embodiment, the length of the CAN data field 650 that is in the same data portion 660 in which the length field 635 is located.
  Channel field 640 which is a 1-byte field that indicates a CAN channel to which the data portion 660 is located. As used herein, the "CAN channel" can refer to a specific CAN bus, a component to which the computing device 505 is communicatively coupled by a CAN bus, a specific CAN channel, or some other CAN-related element.
  A CAN identifier (CAN_ID) field 645, which is a 4-byte field that is usable as an individual identifier of a CAN-related message, or a type of CAN-related message, that is being transmitted. In some embodiments, the CAN_ID is not unique for transmissions related to a CEG such as CEG 530. Rather, in one embodiment the CAN_ID is reused for different transmissions to or from the CEG.

The data portions 660 also include a CAN Data field 650, which in one embodiment is an 8-byte field. The CAN Data field 650 includes data related to the CAN bus to which the data portion 660 pertains. As noted above, the CAN data 650 field, can include data for use by one or both the computing device 505 or a component that is communicatively coupled with a CAN bus, configuration information, initialization information, or some other type of information.

Returning to FIG. 5, the vehicle configuration 500 further includes a number of ECUs such as control ECU 545, sensor ECU 555, and system ECU 565. Generally, the control ECU 545 is related to control of a vehicle (e.g., vehicle 100) and is similar to, for example, the control system 306. The sensor ECU 555 is related to the various sensors of the vehicle and is similar to, for example, one or more of the database system 310, perception system 302, planning system 304, and localization system 308. The system ECU 565 is related to one or more other circuit of the vehicle such as climate control, GPS, a display of the vehicle, an audio system of the vehicle, etc. It will be understood that these ECUs 545/555/565 are intended as example components or ECUs of the vehicle configuration 500, and other embodiments include more, fewer, or different ECUs than are depicted in FIG. 5. In some embodiments, one or more of the CAN busses 535/540/550/560 can be coupled with a plurality of ECUs, or a CAN bus can be further coupled to a non-ECU component such as a radar or some other component.

The ECUs 545/555/565 are communicatively coupled with CAN busses 535, 540, 555, and 560. As used herein, a "CAN bus" refers to a bus that is designed to allow microcontrollers (e.g., ECUs 545/555/565) and an electronic device such as CEG 530 505 to communicate without an intermediary host computer. As shown herein, the vehicle configuration 500 includes both a control CAN bus 535 and a redundant control CAN bus 540 communicatively coupled with the control ECU 545. Similarly, the sensor ECU 555 is communicatively coupled with a sensor CAN bus 550, and the system ECU 565 is communicatively coupled with a system CAN bus 560. Similarly to the ECUs, it will be understood that the depicted and described CAN busses 535/540/550/560 are intended as example CAN busses, and other embodiments include more, fewer, or different CAN busses than are depicted in FIG. 5

In legacy vehicle configurations, the various CAN busses are communicatively coupled directly with the computing device 505 or, more specifically, the processors 510. However, a particular CAN bus will typically have a relatively low data rate, and therefore communication between the computing device or processor(s) and the various ECUs in legacy configurations is limited by the data rate of the CAN bus. Specifically, a processor and a control ECU would be engaged in one-to-one communication over a single CAN bus, and that communication would be limited by the data rate of the CAN bus.

In contrast, embodiments herein include a CEG 530. The CEG 530 is configured to provide a conversion between a CAN message (e.g., a message that is sent or received over one or more of the CAN busses 535/540/550/560) and an Ethernet message (e.g., UDP packet 600 of FIG. 6) that is transmitted over Ethernet link 525. In this way, the vehicle configuration 500 leverages the higher data rate of the Ethernet link 525 (which is significantly higher than the data rate of a CAN bus) to send or receive data related to a plurality of CAN busses between the CEG and the computing device 505 in a single UDP packet. Then, the CEG 530 is configured to engage in one-to-many communication with the various ECUs over the various CAN busses simultaneously.

Various of the depicted elements of the CEG 530 facilitate the reception of CAN data (i.e., CAN data received from the various ECUs 545/555/565 over the various CAN busses 535/540/550/560) and generation of a UDP packet (e.g., UDP packet 600) based on that CAN data.

Figure 7:
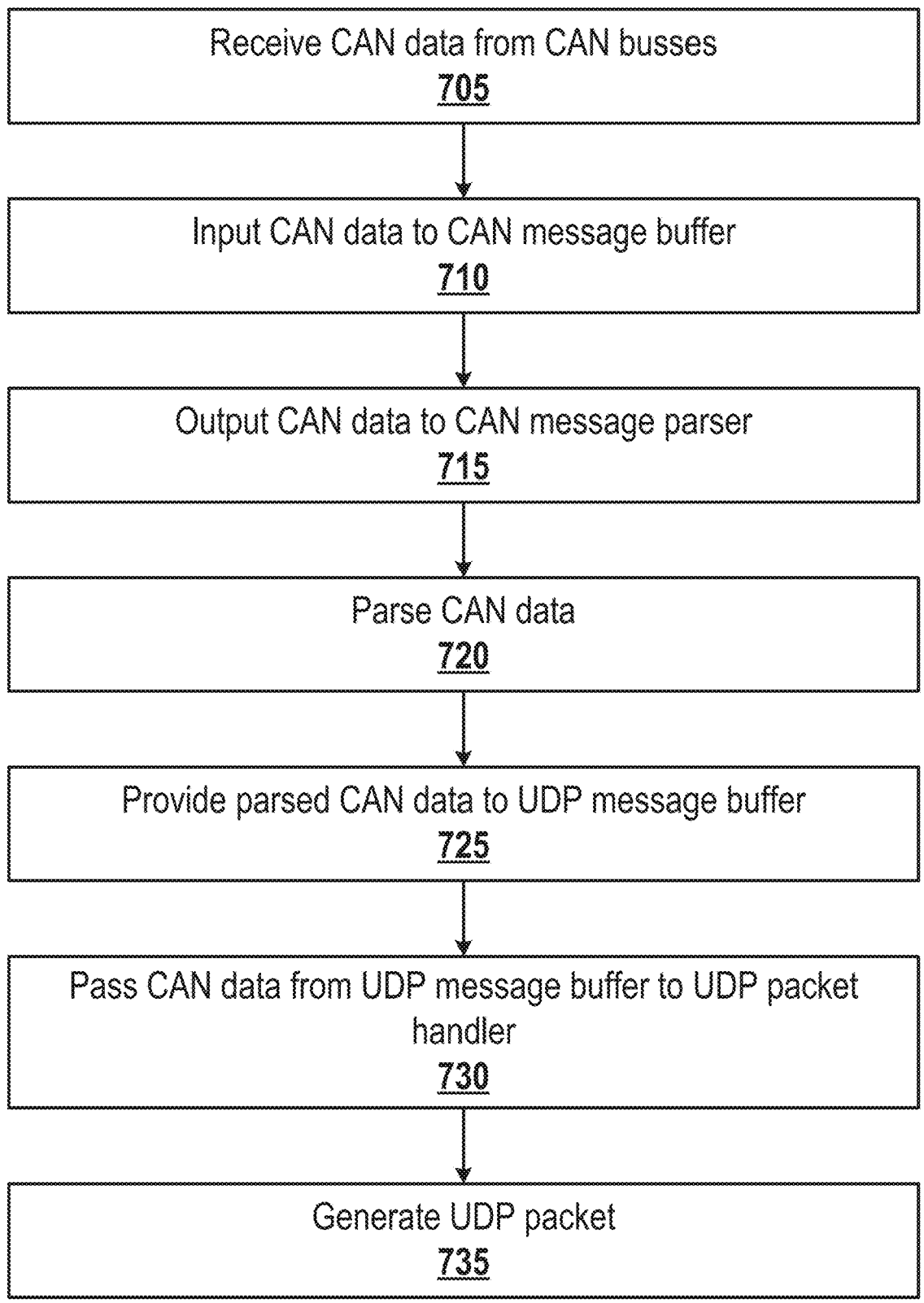
FIG. 7 shows an example operation of the CEG, in accordance with various embodiments.

FIG. 7 shows an example operation of the CEG, in accordance with various embodiments. Specifically, and as depicted in FIG. 7, in order to facilitate the generation and transmission of the UDP packet:

CAN data from the CAN busses 535/540/550/560 is received, at 705, by the CEG 530. The CAN data is input, at 710, to the CAN message buffer 585 as it is received from the CAN busses 535/540/550/560, where the data is held in the CAN message buffer 585 for further processing.

The CAN message buffer 585 outputs, at 715, all or some of the CAN data from the CAN message buffer 585 to the CAN message parser 580, which is configured to parse, at 720, the CAN data and, for example, group data from the same CAN bus, ECU, or CAN channel together. In one embodiment, the data is pushed from the CAN message buffer 585 to the CAN message parser 580 based on identification that the CAN message buffer 585 is full, a control signal received from an ECU over a CAN bus, a pre-identified time-interval, or some other factor. In another embodiment, the data is pulled by the CAN message parser 580 from the CAN message buffer 585 based on a control signal or some other indicator.

The CAN data is then provided, at 725, from the CAN message parser to a UDP message buffer 575 where the data is held for processing by UDP packet handler 570.

The CAN data is then passed, at 730, from the UDP message buffer 575 to the UDP packet handler 570 where the UDP packet (e.g., UDP packet 600) is generated, at 735, based on the CAN data provided by the UDP message buffer 575. In one embodiment, the UDP message buffer 575 provides the data to the UDP packet handler 570 as the UDP message buffer 575 becomes full, based on a pre-set time-interval, or some other criteria. In another embodiment, the UDP packet handler 570 pulls the data from the UDP message buffer 575 as it has the capability to process the CAN data. The UDP packet handler then transmits the generated UDP packet 600 over the Ethernet link 525 to the computing device 505.

As a result of the above, the computing device 505, and particularly the processors 510 of the computing device 505, are able to process the generated UDP packet 600 and identify CAN data related to multiple CAN busses. In some examples, one of the processors 510 identifies, based on data portion 660a of the UDP packet 600, data related to a first CAN bus. The processor 510 also identifies, based on data portion 660b of the UDP packet 600, data related to a second CAN bus.

In one embodiment, the processor(s) 510 are configured to filter data based on one or more tags which may be added, appended, inserted into, or otherwise accompany the data provided to the computing device 505 from the CEG 530. For example, different tags can be appended to the data by the CEG 530 based on one or more elements of the UDP packet 600 (e.g., the CAN_ID 645, the message type 630, etc.). Based on these tags, the processor(s) 510 filter the received data such that only data with certain tags is processed while other data is filtered out.

Similarly, various of the depicted elements of the CEG 530 facilitate the reception of a UDP packet (e.g., UDP packet 600) and then transmission of CAN data to the various ECUs 545/555/565 over the various CAN busses 535/540/550/560.

Figure 8:
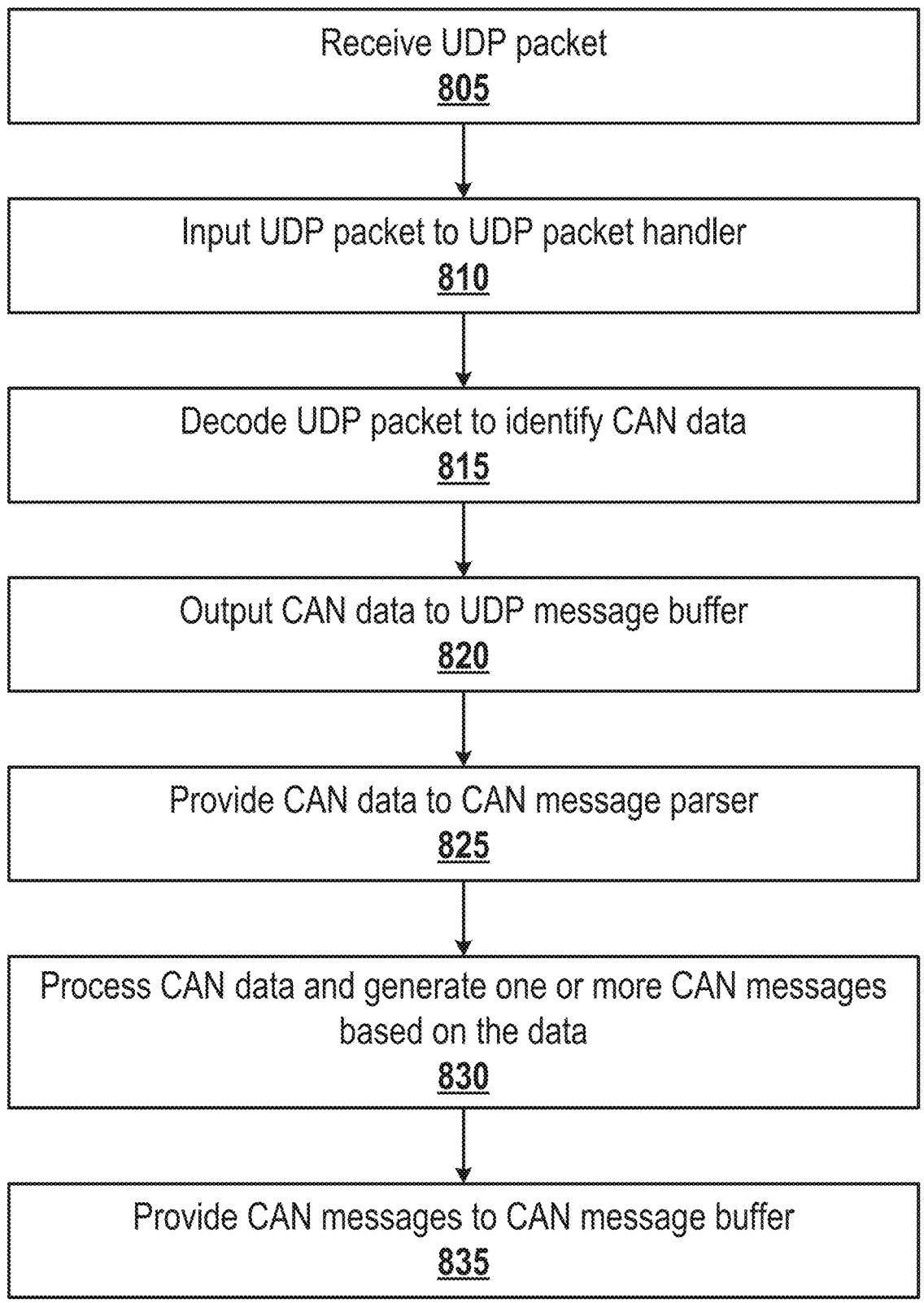
FIG. 8 shows an alternative example operation of the CEG, in accordance with various embodiments.

FIG. 8 shows an alternative example operation of the CEG, in accordance with various embodiments. Specifically, and as shown in FIG. 8, in order to generate CAN data based on the received UDP packet 600:

The UDP packet 600 is received, at 805, from the Ethernet link 525 and input, at 810, to the UDP packet handler 570. The UDP packet handler 570 decodes, at 815, the UDP packet 600 and identifies CAN data based on the UDP packet 600 (e.g., the data from data portions 660a or 660b). More specifically, the CAN data may be identified based on information from the CAN header 665 of the data portions 660 such as the channel field 640 or the CAN_ID field 645.

The UDP packet handler 570 then outputs, at 820, the CAN data to the UDP message buffer 575, which is configured to buffer the data received from the UDP packet handler 570 for processing by the CAN message parser 580.

The data is provided, at 825, to the CAN message parser 580 from the UDP message buffer 575. The CAN message parser 580 is configured to process, at 830, the data received from the UDP message buffer 575 and generate one or more CAN messages (e.g., messages that may be transmitted over the various CAN busses 535/540/550/560) based on the data. In some embodiments, different data portions of the UDP packet are related to the same CAN bus, ECU, or function. Therefore, in this embodiment, the CAN message parser 580 will further group together CAN data related to the same CAN bus, ECU, or function.

The CAN messages generated by the CAN message parser 580 are then provided, at 835, to the CAN message buffer 585, which is configured to store the messages until they can be transmitted along a CAN bus 535/540/550/560 to the relevant ECU 545/555/565. Identification that the message is transmittable from the CAN message buffer 585 is based on, for example, a pre-identified time-interval, a control signal received by the CAN message buffer 585 from the CAN message parser 580 or some other component of the CEG, a control signal received from the ECU which is coupled to the CAN bus over which the CAN message is to be transmitted, or some other indicator.

It will be understood that the depicted elements are example elements of one embodiment of the CEG 530, and other embodiments may include more, fewer, or different elements than are depicted in FIG. 5. Additionally, it will be understood that the various elements of the CEG 530 are implemented as hardware, software, firmware, or a combination thereof. In some embodiments, one or more of the various elements of the CEG 530 are combined in a single circuit or program, whereas in other embodiments each of the various elements of the CEG 530 are implemented through different hardware/software/firmware/etc. than others of the elements of the CEG 530.

In one embodiment, the various buffers 575/585 of the CEG are implemented as non-volatile memory (NVM), RAM, flash memory, or some other type of memory. In one embodiment, the elements described with respect to FIGS. 7 and 8 are the same element. That is, the same UDP packet handler 570, UDP message buffer 575, CAN message parser 580, and CAN message buffer 585 are used for the generation of a UDP packet based on CAN data as are used for the generation of CAN data based on a UDP packet. In another embodiment, each transmission pathway has at least one of its own elements. Specifically, one or more of elements 570/575/580/585 that are used for the generation of a UDP packet based on the CAN data is different from an element 570/575/580/585 that is used for the generation of CAN data based on a UDP packet. Other variations may be present in other embodiments.

FIG. 9 shows an example technique related to the UDP packet of FIG. 6, in accordance with various embodiments. The technique of FIG. 9 is implemented by a CEG such as CEG 530, and more specifically by one or more components thereof.

The technique includes identifying, at 905, a first data related to a first CAN bus and a second data related to a second CAN bus. The data is, for example, CAN data received from a CAN bus such as busses 535, 540, 550, or 560, which is generated by an ECU such as ECUs 545, 555, or 565.

The technique further includes generating, at 910, a UDP packet (e.g., UDP packet 600) that includes a first data portion (e.g., data portion 660*a*) related to the first data and a second data portion (e.g., data portion 660*b*) related to the second data. The generation of the UDP packet may be in accordance with, for example, FIG. 7 described above. The technique then includes transmitting, at 915, the UDP packet to a computing device (e.g., computing device 505) via an Ethernet link (e.g., Ethernet link 525).

FIG. 10 shows an alternative example technique related to the UDP packet of FIG. 6, in accordance with various embodiments. Similarly to FIG. 9, the technique of FIG. 10 is implemented by a CEG such as CEG 530, and more specifically by one or more components thereof.

The technique includes determining, in a UDP packet (e.g., UDP packet 600) received via an Ethernet link (e.g., Ethernet link 525) from a computing device (e.g., computing device 505), a first data portion (e.g., data portion 660*a*) related to a first CAN bus and a second data portion (e.g., data portion 660*b*) related to a second CAN bus. The technique further includes facilitating, at 1010, transmission of the first CAN data by the first CAN bus and facilitating, at 1015, transmission of the second CAN data by the second CAN bus. Specifically, a CAN message related to the first CAN data and a CAN message related to the second CAN data is generated as described above with respect to FIG. 8. The CAN message related to the first CAN data is then transmitted over a first bus (e.g., one of busses 535, 540, 550, or 560) and the CAN message related to the second CAN data is transmitted over another bus.

It will be understood that the above-described techniques of FIGS. 7-10 are intended as example techniques of one embodiment, and other embodiments will vary. For example, other embodiments include more or fewer elements, or elements in a different order, than are depicted in at least one of FIGS. 7-10.

In the foregoing description, embodiments have been described with reference to numerous specific details that may vary from implementation to implementation. The description and drawings are, accordingly, to be regarded in an illustrative rather than a restrictive sense. The sole and exclusive indicator of the scope of the present disclosure, and what is intended by the applicants to be the scope of the present disclosure, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A system for use in a vehicle, wherein the system comprises:
   a first controller area network (CAN) bus that is configured to convey first CAN data from a first electronic control unit (ECU);
   a second CAN bus that is configured to convey second CAN data from a second ECU;
   a CAN Ethernet gateway (CEG) communicatively coupled with the first CAN bus and the second CAN bus, the CEG configured to generate a user datagram protocol (UDP) packet that comprises:
   a packet header;
   a first data portion that comprises a first CAN header and the first CAN data, the CAN header comprising a message type of the first CAN data and a channel of the first CAN data; and
   a second data portion that comprises a second CAN header and the second CAN data; and
   a computing device that is communicatively coupled with the CEG by an Ethernet link, the computing device configured to:
   identify, based on the first data portion of the UDP packet, the first CAN data;
   identify, based on the second data portion of the UDP packet, the second CAN data; and operate the vehicle based on the first and second CAN data.

2. The system of claim 1, wherein the first CAN bus is one of a control bus, a redundant control bus, a sensor bus, and a system bus.

3. The system of claim 1, wherein the second CAN header comprises a message type of the second CAN data and a channel of the second CAN data.

4. The system of claim 3, wherein the first CAN header further comprises a length of the first CAN data, and a CAN identifier (CAN_ID) of the first CAN data.

5. The system of claim 1, wherein the CEG comprises:
a CAN message parser configured to parse the first and second CAN data; and
a UDP packet handler to generate the UDP packet.

6. The system of claim 1, wherein the computing device comprises a first processor and a second processor that are communicatively coupled with the CEG by an Ethernet switch of the computing device.

7. The system of claim 1, wherein the computing device is physically separate from, but communicatively coupled to, the CEG.

8. A system for use in a vehicle, wherein the system comprises:
a computing device configured to generate a user datagram protocol (UDP) packet that comprises:
a packet header;
a first data portion that comprises a first controller area network (CAN) header and first CAN data, the first CAN header comprising a message type of the first CAN data and a channel of the first CAN data; and
a second data portion that comprises a second CAN header and second CAN data; and
a CAN Ethernet gateway (CEG) communicatively coupled with the computing device by an Ethernet link, the CEG configured to:
generate, based on the UDP packet received from the computing device, a first CAN packet that comprises the first CAN data and a second CAN packet that comprises the second CAN data;
facilitate transmission of the first CAN packet on a first CAN bus of the vehicle; and
facilitate transmission of the second CAN packet a second CAN bus of the vehicle.

9. The system of claim 8, wherein the first CAN bus is one of a control bus, a redundant control bus, a sensor bus, and a system bus.

10. The system of claim 8, wherein the first CAN header comprises a message type of the first CAN data, a channel of the first CAN data, a length of the first CAN data, and a CAN identifier (CAN_ID) of the first CAN data.

11. The system of claim 8, wherein the CEG comprises:
a UDP packet handler configured to identify, based on the UDP packet, the first data portion and the second data portion; and
a CAN message parser configured to generate, based on the first data portion and the second data portion, the first CAN packet and the second CAN packet.

12. The system of claim 8, wherein the computing device comprises a first processor and a second processor that are communicatively coupled with the CEG by an Ethernet switch of the computing device.

13. The system of claim 8, wherein the computing device is physically separate from, but communicatively coupled to, the CEG.

14. The system of claim 8, wherein the first CAN bus relates to a power train of the vehicle, and the second CAN bus relates to engine control of the vehicle.

15. A computer-implemented method comprising:
identifying, by a controller area network ethernet gateway (CEG) of a vehicle, first controller area network (CAN) data received from a first electronic control unit (ECU) on a first CAN bus of the vehicle;
identifying, by the CEG, second CAN data received from a second ECU on a second CAN bus of the vehicle; and
generating, by a processor, a user datagram protocol (UDP) packet that comprises:
a header;
a first data portion that comprises a first CAN header and the first CAN data, the first CAN header comprising a message type of the first CAN data and a channel of the first CAN data; and
a second data portion that comprises a second CAN header and the second CAN data.

16. The computer-implemented method of claim 15, wherein the method further comprises facilitating, by the CEG, transmission of the UDP packet to a computing device by an Ethernet link.

17. The computer-implemented method of claim 15, wherein the first ECU has a different function than the second ECU.

18. The computer-implemented method of claim 15, wherein:
the first CAN bus is one of a control bus, a redundant control bus, a sensor bus, and a system bus; and
the second CAN bus is another of the control bus, the redundant control bus, the sensor bus, and the system bus.

19. The computer-implemented method of claim 15, wherein the first header comprises a message type of the first CAN data, a channel of the first CAN data, a length of the first CAN data, and a CAN identifier (CAN_ID) of the first CAN data.

20. The computer-implemented method of claim 15, wherein the first CAN data relates to a power train of the vehicle, and the second CAN data relates to engine control of the vehicle.

* * * * *